(12) United States Patent
Balzer et al.

(10) Patent No.: US 8,870,125 B2
(45) Date of Patent: Oct. 28, 2014

(54) TRAILING EDGE SPLIT FLAP WITH PNEUMATIC ACTUATION

(75) Inventors: Michael A. Balzer, Kirkland, WA (US); Gregory M. Santini, Bothell, WA (US); Michael K. Klein, Bothell, WA (US)

(73) Assignee: The Boeing Company, Chicago, IL (US)

(*) Notice: Subject to any disclaimer, the term of this patent is extended or adjusted under 35 U.S.C. 154(b) by 438 days.

(21) Appl. No.: 13/187,634

(22) Filed: Jul. 21, 2011

(65) Prior Publication Data

US 2013/0020444 A1 Jan. 24, 2013

(51) Int. Cl.
*B64C 3/50* (2006.01)
*B64C 9/16* (2006.01)

(52) U.S. Cl.
CPC .. *B64C 9/16* (2013.01); *Y02T 50/44* (2013.01); *Y02T 50/32* (2013.01)
USPC .......................................... 244/215; 244/99.5

(58) Field of Classification Search
CPC .................................... B64C 9/18; B64C 9/16
USPC ....... 244/212–217, 89, 90 R, 90 A, 99.5, 99.7
See application file for complete search history.

(56) References Cited

U.S. PATENT DOCUMENTS

| RE19,412 | E | | 1/1935 | Zaparka |
|---|---|---|---|---|
| 2,428,936 | A | | 9/1943 | Hunter |
| 2,392,443 | A | * | 1/1946 | Youngman .................... 244/113 |
| 3,203,647 | A | | 8/1965 | Alvarez-Calderon |
| 3,480,237 | A | * | 11/1969 | Appleby ......................... 244/46 |
| 3,586,267 | A | * | 6/1971 | Ingelman-Sundberg ..... 244/203 |
| 3,711,039 | A | | 1/1973 | James |
| 4,717,097 | A | | 1/1988 | Sepstrup |
| 6,015,115 | A | | 1/2000 | Dorsett et al. |
| 2011/0038727 | A1 | | 2/2011 | Vos et al. |

* cited by examiner

*Primary Examiner* — Brian M O'Hara
(74) *Attorney, Agent, or Firm* — Ostrager Chong Flaherty & Broitman P.C.

(57) ABSTRACT

A system for pneumatically actuating a split flap hingedly mounted near or at a trailing edge of an airfoil. The system includes a bladder system disposed between the split flap and the upper surface of the airfoil. The split flap is a small-chord (usually 1-3% of total wing chord) long-span lower panel which separates from the airfoil trailing edge by means of a hinge or a flexible lower skin. Deployment of the split flap is actuated pneumatically by the inflatable bladder system. The split flap may exist at a fixed wing trailing edge, a moving flap trailing edge, or an empennage trailing edge. The pneumatic bladder provides distributed force to extend and retract the split flap. This pneumatic approach eliminates extra drag, reduces cost and weight, and lessens flutter concerns.

11 Claims, 9 Drawing Sheets

TRAILING EDGE SPLIT FLAP WITH PNEUMATIC ACTUATION

BACKGROUND

The embodiments disclosed hereinafter generally relate to hinged surfaces on the trailing edge of airfoils of a fixed-wing aircraft, such as wings, flight control surfaces (e.g., flaps), and horizontal stabilizers. In particular, the embodiments disclosed herein relate to methods for actuating split flaps hingedly mounted to such airfoils.

A split flap is a hinged plate which forms a portion of an airfoil. A split flap provides aerodynamic advantages to an aircraft, but its small scale (typically 1-3% of chord) and location at the extreme trailing edge create difficulties.

It is known to actuate a split flap by means of a complicated mechanical linkage, typically with some form of external hinge or actuation. External hinges or actuation produce extra drag. Complex mechanical linkages involve high part counts, leading to additional cost and weight. The discrete mechanical supports may be more subject to flutter, and a linkage will be susceptible to jamming. Furthermore, actuation of the split flap at discrete points (such as a typical mechanical linkage) is difficult due to the very low stiffness of the small thin split flap, which may increase the risk of the split flap buzzing or fluttering. This forces actuation at many points.

There is a need for systems and methods for actuating split flaps which eliminate extra drag, reduce cost and weight, and lessen flutter and jamming concerns.

SUMMARY

The embodiments disclosed hereinafter relate to a system for pneumatically actuating a split flap hingedly mounted near or at a trailing edge of an airfoil. The system includes a bladder system disposed between the split flap and the upper surface of the airfoil. The split flap is a small-chord (usually 1-3% of total wing chord) long-span lower panel which separates from the airfoil trailing edge by means of a hinge or a flexible lower skin. Deployment of the split flap is actuated pneumatically by the inflatable bladder system. The split flap may exist at a fixed wing trailing edge, a moving flap trailing edge, or an empennage trailing edge. The pneumatic bladder provides distributed force to extend and retract the split flap.

The pneumatic actuation provides many features and advantages. The bladder system will have few moving parts, thereby reducing cost and weight, as well as reducing jam risk. The bladder system provides continuous support to the split flap along its length, which allows for a thinner split flap (no actuation hard points or severe stiffness requirements) and reduces the risk of flutter by eliminating unsupported span (combined with a piano hinge or a continuous flexing skin). The configuration of the bladder system can be tailored to create spanwise variation in the deployment angle of the split flap to best meet aerodynamic demands. The bladder can have internal spanwise-oriented septa which allow for multiple deployed positions for the split flap. Chordwise-oriented septa can reduce the spanwise extent of split flap retraction due to a ruptured bladder. Load alleviation for the flap under high loads can be achieved by deflating the bays of the bladder system, which can be done quickly by means of pressure release valves (possibly redundant). Applying suction to the bladder system keeps the flap fully retracted under load. Torsional springs can be added if additional flap closing force is required.

The apparatus in accordance with various embodiments disclosed hereinafter comprises: an airfoil having upper and lower surfaces; a split flap coupled to the lower surface; and an array of inflatable bays disposed between the split flap and the upper surface of the airfoil. In one implementation, the inflatable bays are arranged in columns and rows, adjacent bays in each column being separated by a spanwise septum, while adjacent bays in each row are separated by a chordwise septum. The inflatable bays in any particular column can be inflated in sequence, thereby deploying the split flap in stages. The inflatable bays in alternating columns can be inflated using independent sources of pressurized air, thereby mitigating the effects of rupture of any one bay by maintaining pressure across the other half of the flap. In addition, the bays in different columns may be constructed to have differing shapes when fully inflated, resulting in varying degrees of flap deflection in a spanwise direction.

In accordance with the broad scope of the invention, the array has at least two inflatable bays arranged in any number of columns and any number of rows. In the case where the array includes only two inflatable bays, in one embodiment they can be arranged in one row and in another embodiment they can be arranged in one column. Although in the embodiments disclosed herein the array of inflatable bays has two rows and more than two columns, the following aspects are indicative of the broad scope of various aspects of the invention.

One aspect of the invention is an apparatus comprising: an airfoil having upper and lower surfaces; a deployable flap having a forward edge supported by the lower surface and extending in a spanwise direction; and a bladder system comprising first and second bays which are individually inflatable and adjacent to each other. The first and second bays are disposed between a portion of the flap and the upper surface. That portion of the flap has a first configuration when the first bay is inflated and the second bay is deflated, and has a second configuration different than the first configuration when the first and second bays are both inflated. The flap portion is deployed at a greater angle relative to the lower surface when the flap portion is in the second configuration than when the flap portion is in the first configuration.

Another aspect of the invention is a method for deploying a hinged flap that is supported by a lower surface of an airfoil near the airfoil's trailing edge, comprising supplying pressurized air to mutually adjacent first and second bays of a bladder system, the first and second bays being disposed between an upper surface of the airfoil and at least a spanwise section of the hinged flap, the first spanwise section of the hinged flap being deflected to a first deployed position when the first bay is inflated and the second bay is deflated and being deflected to a second deployed position beyond the first deployed position when the first and second bays are both inflated.

A further aspect of the invention is an apparatus comprising: an airfoil having upper and lower surfaces and a trailing edge; a deployable flap having a forward edge supported by the lower surface near the trailing edge of the airfoil and extending in a spanwise direction; and at least one bladder disposed between the upper surface and the flap, the at least one bladder being segmented in a spanwise direction to form spanwise segments, wherein the spanwise segments of the at least one bladder are inflatable to cause the flap to move from a stored position to a deployed position.

Other aspects of the invention are disclosed and claimed below.

BRIEF DESCRIPTION OF THE DRAWINGS

FIGS. 1-3 show the respective position of the split flap before actuation, after a first actuation stage and after a second actuation stage.

Reference will hereinafter be made to the drawings in which similar elements in different drawings bear the same reference numerals.

DETAILED DESCRIPTION

Figure 1:
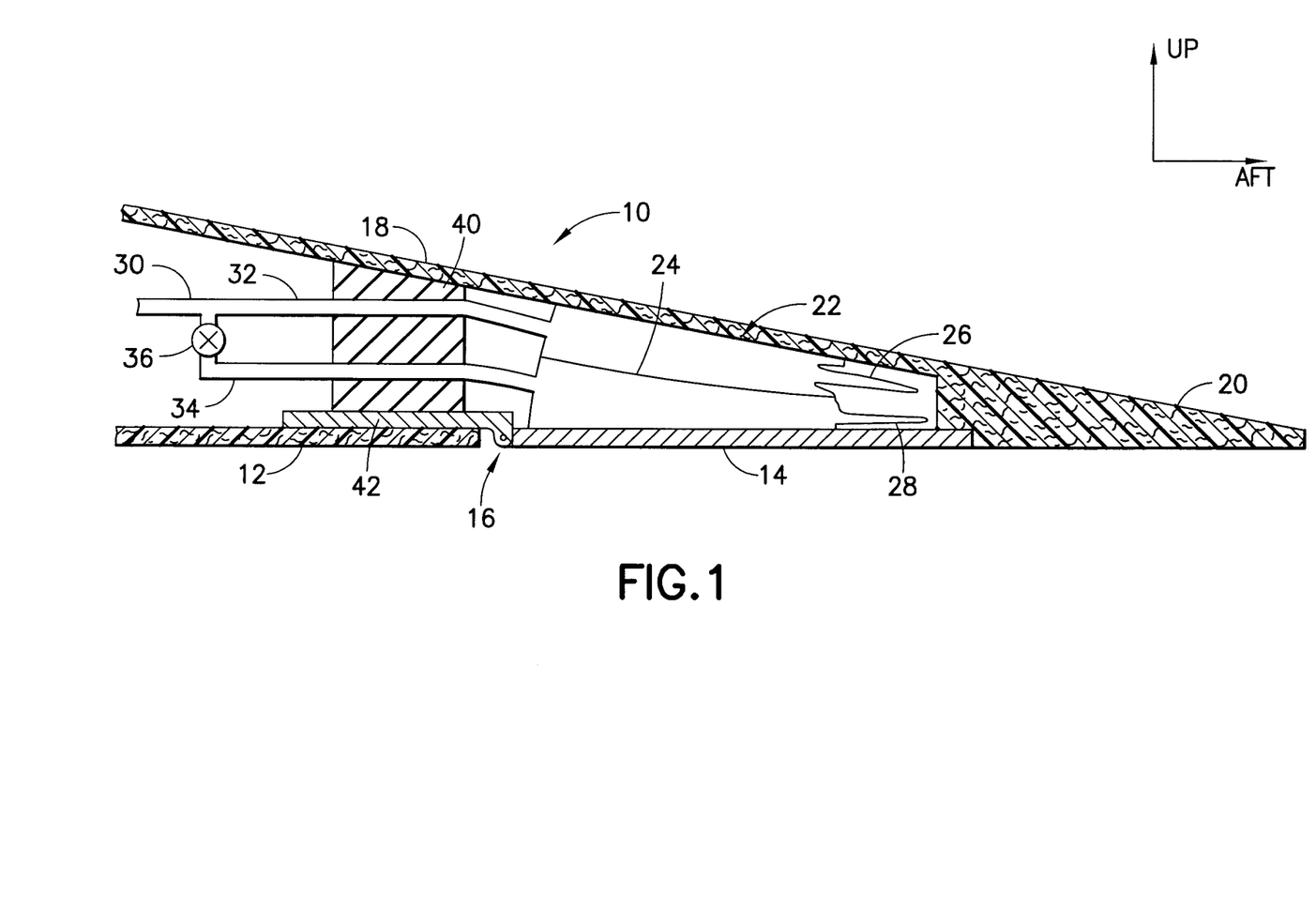
FIGS. 1 through 3 are diagrams showing a cross-sectional view of a portion of an airfoil having a trailing edge equipped with a pneumatically actuatable split flap in accordance with various embodiments.

FIG. 1 shows a cross-sectional view of a trailing edge portion of an airfoil 10 equipped with a pneumatic actuator for deploying a split flap 14 in accordance with various embodiments. The airfoil 10 comprises a lower aerodynamic surface 12, an upper aerodynamic surface 18 and a solid tip 20 at the extreme trailing edge. The airfoil may be made of carbon fiber-reinforced polymer, metal or other suitable material. The deployable flap 14 has a forward edge supported by the lower surface 14 and extends in a spanwise direction (i.e., a direction parallel to the span of the airfoil). The split flap 14 may also be made of carbon fiber-reinforced polymer, metal (e.g., aluminum) or other suitable material.

FIG. 1 shows the split flap 14 in an unactuated state. In the unactuated state, the flap 14 is generally aligned with the lower surface 12 and covers an opening in the lower surface. The solid tip 20 has a recess for receiving the rear edge of the flap 14. The flap 14 is supported by the lower surface 12 via a mounting plate 42 having a hinge 16 at its rear edge. Hinge 16 may be constructed in the manner of a piano hinge. The flap 14 is pivotable relative to the lower surface about an axis of hinge 16. Alternatively, the flap could be connected to the lower surface by means of a continuous flexing skin, thereby eliminating the hinge.

The pneumatic actuator shown in FIG. 1 comprises a bladder system disposed between the upper surface 18 of airfoil 10 and the split flap 14. The only components of the bladder system which are visible in FIG. 1 are a collapsible bladder 22 having an internal septum 24 that partitions the bladder 22 to form a first-stage bay 26 and a second-stage bay 28 which share a common wall (i.e., septum 24). The septum 24 forms respective interior surfaces of bays 26 and 28. Bays 26 and 28 are stacked between the upper surface 18 of airfoil 10 and the split flap 14. One portion of bay 26 is attached (e.g., by adhesive) to the airfoil upper surface 18, while one portion of bay 28 is similarly attached to the flap 14. Both bays are shown in a collapsed (i.e., non-inflated) state.

In accordance with different embodiments, the stacked bays 26 and 28 shown in FIG. 1 may form one column in a bladder system comprising a multi-column array of inflatable bays (not visible in FIG. 1, but see FIGS. 5 and 6, to be described in detail later), each column comprising a pair of similarly stacked inflatable bays disposed between the upper surface 18 of airfoil 10 and respective spanwise sections of the split flap 14. In the case of a two-row multi-column array of inflatable bays, the internal septum 24 seen in FIG. 1 may extend in a spanwise direction for the entire length of the array, with adjacent bays in each row sharing a common chordwise septum.

In the alternative to adjacent bays which share a common septum, two adjacent bays (whether in a row or a column) may be formed as separate receptacles or bags which are then attached by adhesive or heat bonding or other suitable means, depending on the material used to construct the receptacles.

In accordance with further alternatives, a multiplicity of pairs of stacked bays may be installed separately without attachment of successive pairs of stacked bays to each other. Furthermore, the respective pairs of stacked bays may be separated by gaps and need not be adjacent to each other.

In accordance with some embodiments, the bladder system can be made of a collapsible fiber-reinforced material, the matrix material being nylon or rubber. The use of fiber-reinforced material has the advantage that a bay will cease to expand in response to internal air pressure above a designed level when a predetermined configuration is attained, i.e., when the walls of the bay are fully expanded to the point where the reinforcing fibers become fully extended and resist further expansion of the bay.

Referring again to FIG. 1, bays 26 and 28 are individually inflatable via respective air inlet tubes 32 and 34 which are coupled to respective ports of those bays. Although FIG. 1 does not indicate the hardware for coupling an air inlet tube to a bladder port, such hardware is well known to persons skilled in the inflatable bladder art. (For example, each bay of the bladder system may be provided with a mouth which is clamped to the end of a pipe or tube.) Respective portions of air inlet tubes 32 and 34 are embedded in and thereby supported by a block 40 of polymeric material, e.g., phenolic resin. In the particular configuration of the air supply system partly shown in FIG. 1, the air inlet tube 32 is in fluid communication with an air distribution pipe 30, while the air inlet tube 34 is in fluid communication with the air distribution pipe 30 via a valve 36. The air distribution pipe 30, in turn, communicates with a source of pressurized air, e.g., an air pump (not shown in FIG. 1).

Optionally, a valve could be installed between air inlet tube 32 and air distribution pipe 30. Alternatively, valve 36 could be omitted and a valve could be placed between the pressurized air source and the air inlet tube 32, which arrangement would enable the inflation of bay 28 before the inflation of bay 26.

More specifically, the air distribution pipe 30 can be part of an air distribution system which is coupled to the source that provides the high-pressure input for operating the system. For example, the source can be connected to a main distribution valve via a main duct (not shown in FIG. 1). A controller (not shown) electrically activates the main distribution valve via an electrical line when deployment of the split flap has been commanded. The controller can be activated by the pilot or it can be preprogrammed according to flight conditions. When the main distribution valve is open, it distributes pressurized air to a set of valves (e.g., valve 36 shown in FIG. 1) via a manifold. The open valves in turn supply pressurized air to respective air inlet tubes.

Figure 2:
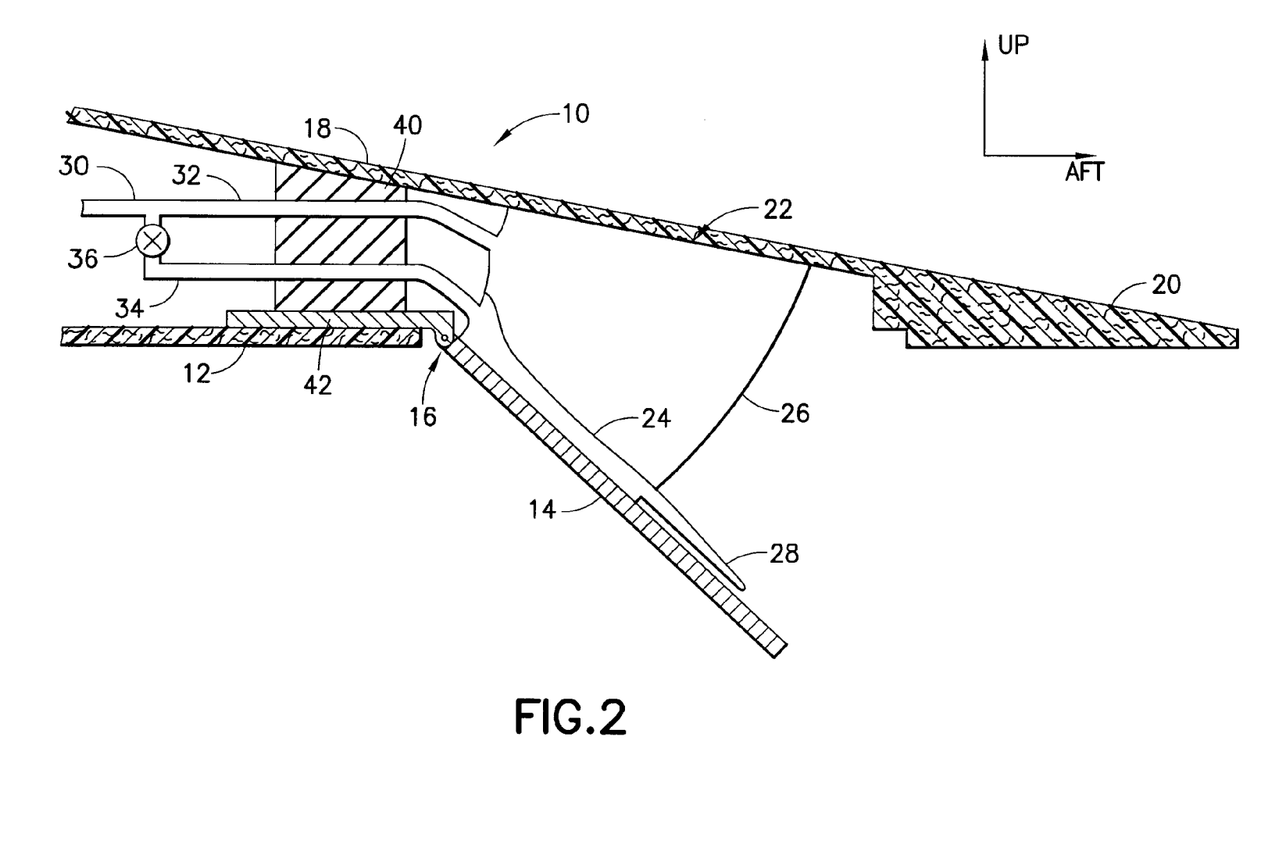
Figure 3:
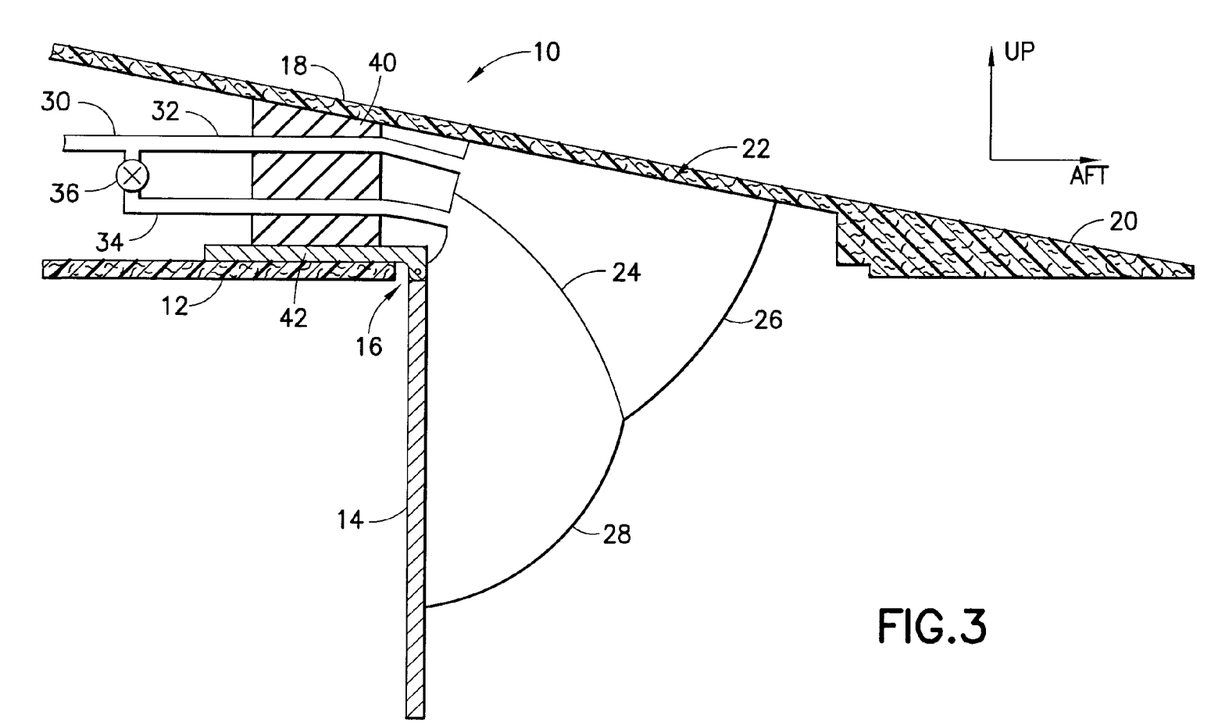

In cases where the source of pressurized air is an electronically controlled air pump, the controller also activates the air pump when deployment of the split flap has been commanded. FIGS. 2 and 3 show the flap position and state of the inflatable bays upon completion of first and second stages of actuation, respectively. In the first stage, partial deployment of flap 14 is actuated by inflation of bay 26. FIG. 2 shows a state wherein, when bay 26 is fully inflated, flap 14 is deflected at a first angle relative to lower surface 12 of airfoil 10. In the second stage, full deployment of flap 14 is actuated by inflation of bay 28. FIG. 3 shows a state wherein, when bays 26 and 28 are both fully inflated, flap 14 is deflected at a second angle greater than the first angle. Alternatively, bays 26 and 28 can be inflated concurrently.

However, in view of the fact that the flap 14 is not a rigid structure and is susceptible to twisting, all spanwise sections of the split flap will not be deflected at precisely the same angle during either partial or full deployment. In the example depicted in FIGS. 2 and 3, the depicted portion of flap 14 has a first configuration when bay 26 is inflated and bay 28 is deflated (as seen in FIG. 2), and has a second configuration different than the first configuration when bays 26 and 28 are both inflated (as seen in FIG. 3). Other portions of the flap not depicted in FIGS. 2 and 3 may be deflected at angles different than those depicted in FIGS. 2 and 3.

Moreover, in the case where an array of inflatable bays having multiple columns (each column consisting of a pair of stacked bays of the type depicted in FIGS. 1-3) is installed between the flap and the upper surface of the airfoil, the pair of bays may be constructed such that respective columns have different configurations when the bays in those columns are fully inflated. This allows the designer to tailor the deflection of the flap such that the amount of deflection varies in a spanwise direction.

It should also be appreciated that the number of inflatable bays in a column can be greater than two. For example, if each stack had three bays, then upon inflation of the first bay only, the flap would be deployed to a first partially deployed position; then upon inflation of the second bay while the first bay remains inflated, the flap would be deployed to a second partially deployed position intermediate the first partially deployed position and a fully deployed position; and finally, upon inflation of the third bay in the stack while the first and second bays remain inflated, the flap would be deployed to the fully deployed position.

Figure 4:
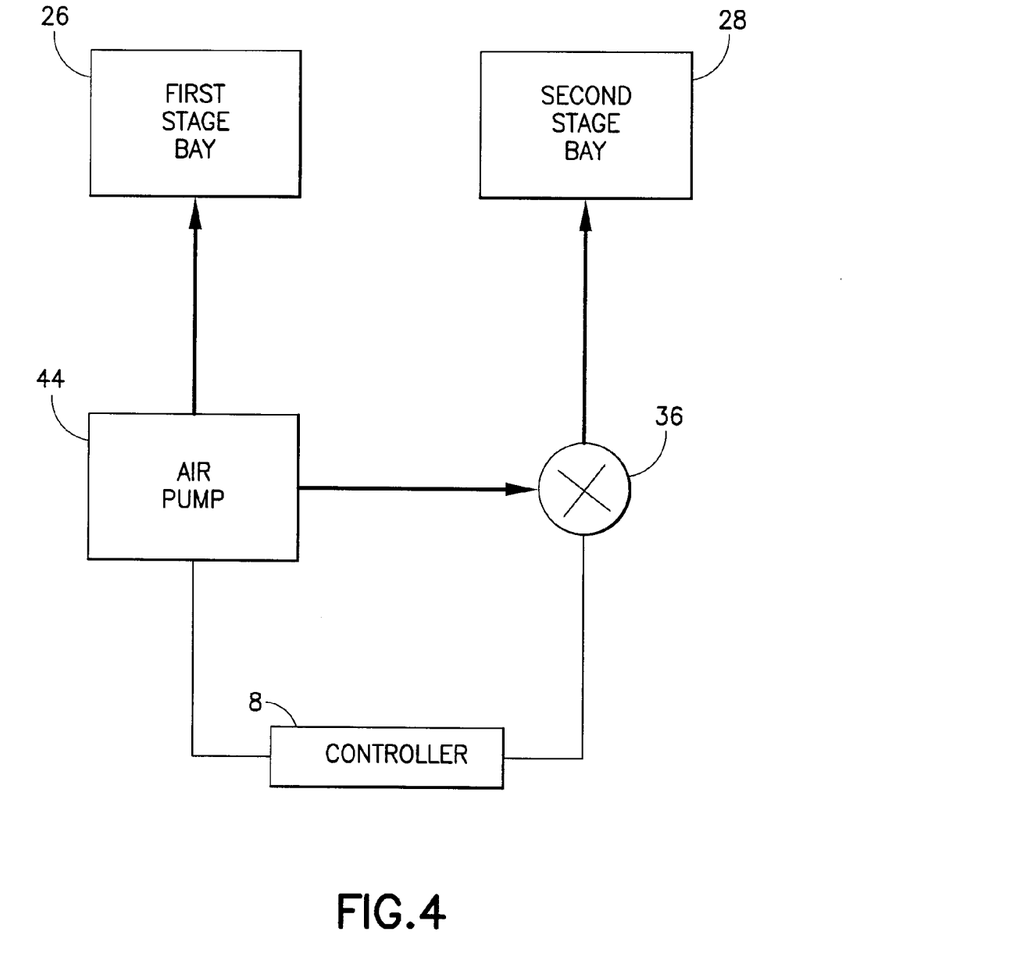
FIG. 4 is a diagram showing components of a system for pneumatically actuating deflection of the portion of a split flap depicted in FIGS. 1-3. The boldface arrows indicate airflow through pneumatic connections, while the lines intersecting the controller indicate electrical connections.

FIG. 4 shows components of a system for pneumatically actuating deflection of the portion of a split flap depicted in FIGS. 1-3. In the first stage of actuation, bay 26 is inflated when a controller 8 activates an air pump 44. The boldface arrows in FIG. 4 indicate airflow through pneumatic connections, while the lines intersecting the controller indicate electrical connections. In the second stage of actuation (subsequent to the first stage), bay 28 is inflated when a controller 8 opens valve 36 (while air pump 44 is still activated), thereby placing bay 28 in fluid communication with air pump 44. In a configuration where an intervening valve is installed between air pump 44 and bay 26 (not shown in FIG. 4), that intervening valve would be opened by the controller during the first stage of actuation, thereby placing bay 28 in fluid communication with air pump 44.

The controller 8 can be programmed to activate the air pump and not open valve 36 upon receipt of a command which indicates that the split flap should be deflected by the angle depicted in FIG. 2. Furthermore, controller 8 can be programmed to activate the air pump and then open valve 36 upon receipt of a command indicating that the split flap should be deflected by the angle depicted in FIG. 3, which is greater than the angle depicted in FIG. 2.

Figure 5:
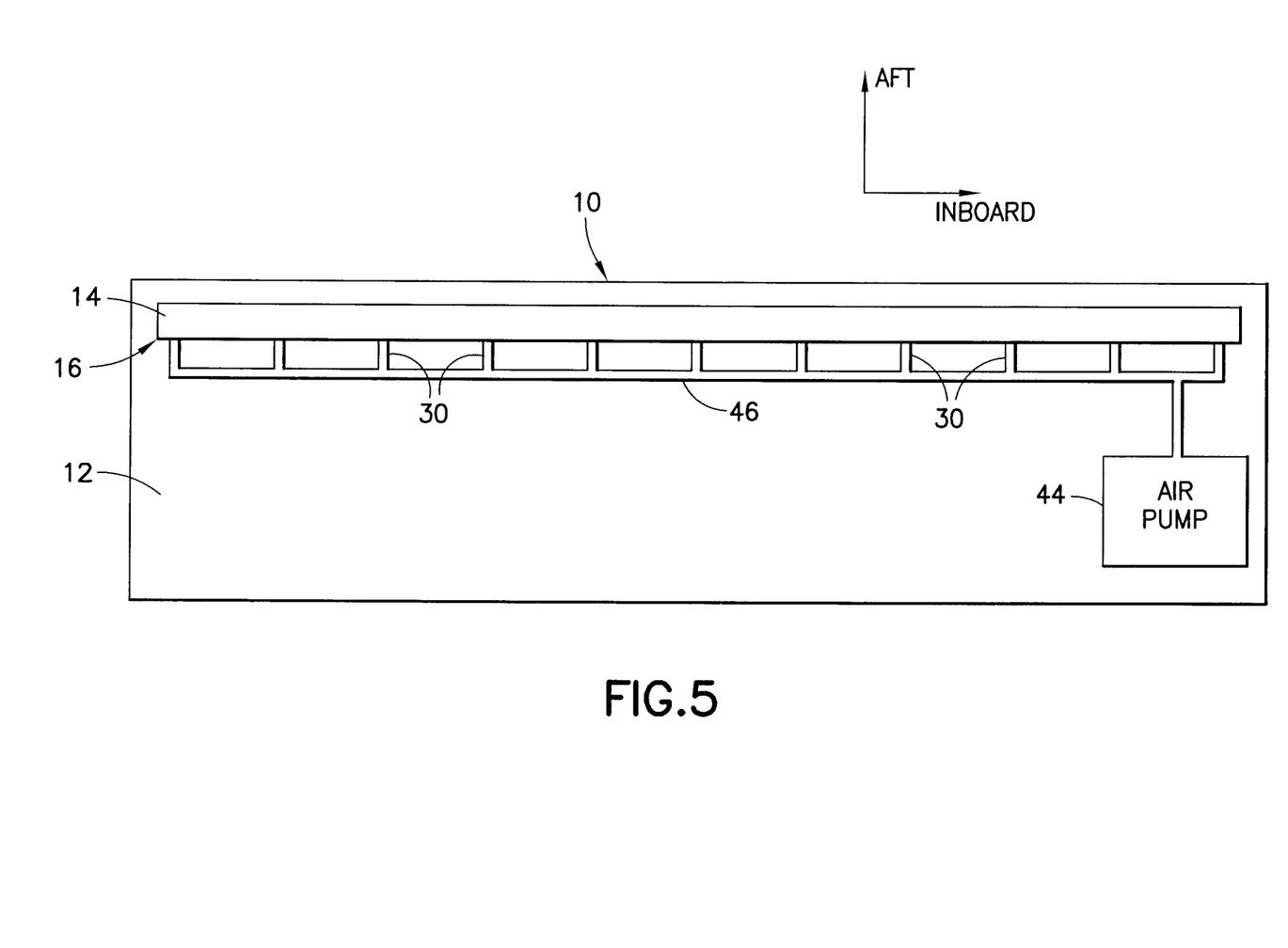
FIG. 5 is a diagram showing a plan view of a system for supplying pressurized air to actuate a split flap in accordance with one embodiment.

FIG. 5 shows a system for supplying pressurized air to actuate a split flap in accordance with one embodiment. The view in FIG. 5 is looking up at an airfoil 10 with a split flap 14 seated in an opening in a lower surface 12 of airfoil 10. In this example, the airfoil 10 is a trailing edge flap and the split flap 14 is a tip flap that is deflectable (in a direction out of the paper) relative to the trailing edge flap. The system shown in FIG. 5 includes an array of inflatable bays (located behind flap 14 and not visible from the vantage of FIG. 5. In the example seen in FIG. 5, the array of inflatable bays has two rows and eleven columns, each column of bays being arrange in a stack as previously described with reference to FIGS. 1-3. Each pair of stacked bays can be inflated by supplying pressurized air from an air pump 44. Optionally, the air pump 44 could be remotely located (off the flap) if desired.

The pressurized air from pump 44 is distributed by a air feed line 46 to a multiplicity of air distribution pipes 30. Consistent with the description of the air distribution pipe 30 shown in FIGS. 1-3, each air distribution pipe 30 seen in FIG. 5 can supply air to a respective pair of stacked bays via respective valves and air inlet tubes (not shown in FIG. 5). Additional valves can be installed (for example, in the respective air distribution pipes 30) as needed to avoid loss of pressure in the feed line 46 in the event of a rupture somewhere in the bladder system. Also, if the flap is made of solid laminate composite or sheet metal, it will tend to twist if some, but not all bays deflate. However, other bays which remain inflated would still hold the flap in a deflected position, even as the flap twist angle varies.

In the implementation shown in FIG. 5, a single air pump drives the entire flap using a single feed line. The air pump is reversible so that the flap can be retracted by sucking air out of the feed line 46, thereby sucking air out of the collapsible bays. Redundant air release valves (not shown in FIG. 5) can be placed on the inflatable bays to facilitate flap retraction if needed. The state of each air release valve can be controlled by the same controller which controls the states of the air distribution valves. Each air release valve opens the bay on which the valve is installed. Then the external pressure applied by the airstream on flap 14 collapses the bay and forces air out the open air release valve. If more closing force is needed, torsional springs can be installed at the hinge line 16 to urge the flap to close more rapidly.

Figure 6:
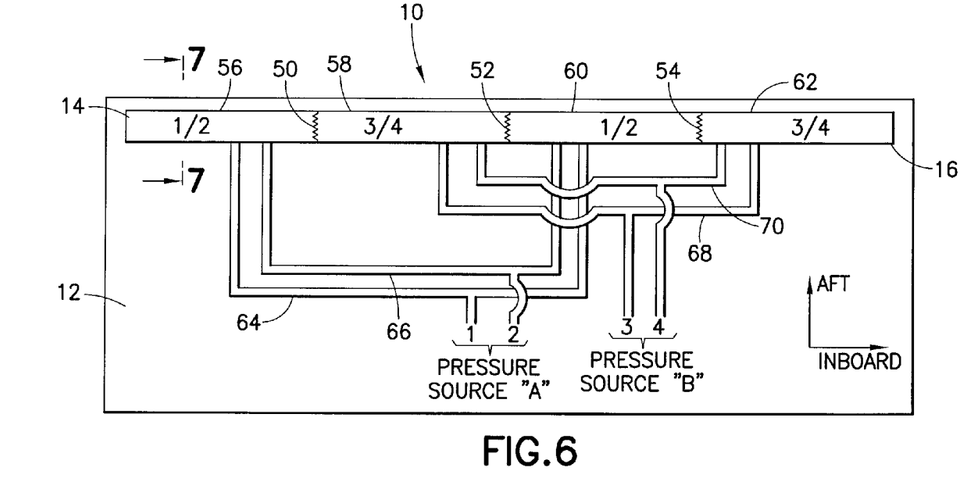
FIG. 6 is a diagram showing a plan view of a system for supplying pressurized air to actuate a split flap in accordance with another embodiment.

FIG. 6 shows a system for supplying pressurized air to actuate a split flap in accordance with another embodiment. Again, the view in FIG. 6 is looking up at an airfoil 10 with a split flap 14 seated in an opening in a lower surface 12 of airfoil 10. The system shown in FIG. 6 includes an array of inflatable bays located behind flap 14, but for purposes of illustration, fours adjoining pairs of stacked inflatable bays are identified by reference numerals 56, 58, 60 and 62 in FIG. 6. These bays share common boundaries, which take the form of chordwise septa 50, 52 and 54, which partition a bladder into four spanwise sections.

Figure 7:
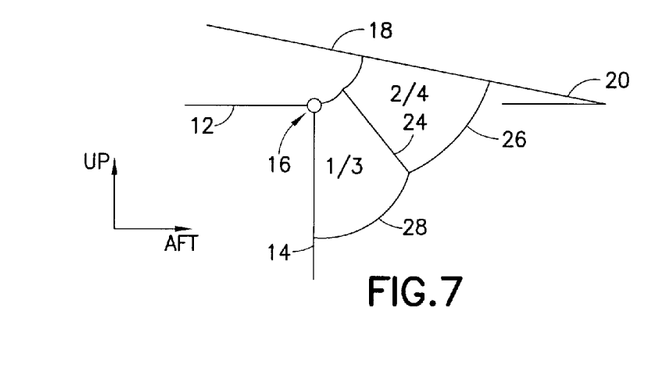
FIG. 7 is a diagram showing a sectional view of a portion (i.e., the airfoil trailing edge with split flap) of the system depicted in FIG. 6, the section being taken along line 7-7 indicated in FIG. 6.

FIG. 7 is a diagram showing a sectional view of a portion (i.e., the airfoil trailing edge with split flap) of the system depicted in FIG. 6, the section being taken along line 7-7 indicated in FIG. 6. As seen in FIG. 7, each spanwise section is in turn partitioned by a spanwise septum 24 to form inflatable bays 26 and 28 of a type previously described.

Thus, viewed in conjunction, FIGS. 6 and 7 show an exemplary bladder system consisting of an array having two rows and four columns of inflatable bays, the stacked bays in each column sharing a respective spanwise septum 24, and the bays in adjacent columns sharing a respective chordwise septum 50, 52 or 54. The designations 1/2 in FIG. 6 indicate two columns (each being a pair of stacked bays), the inflatable bays of which are selectively placed in fluid communication with a pressure source A (not shown) stacks. Similarly, the designations 3/4 in FIG. 6 indicate two columns (each being a pair of stacked bays), the inflatable bays of which are selectively placed in fluid communication with a pressure source B (not shown). As seen in FIG. 6, the bay pairs 1/2 are arranged in alternating sequence with the bay pairs 3/4. Bay No. 1 of each bay pair 1/2 can be inflated by pressure source A using air distribution subsystem 64, whereas Bay No. 2 of each bay pair 1/2 can be inflated by pressure source A using air distribution subsystem 66. As previously described, Bays Nos. 1 and 2, corresponding to bays 28 and 26 shown in FIG. 7, can be inflated in sequence or concurrently. Similarly Bay No. 3 of each bay pair 3/4 can be inflated by pressure source B using air distribution subsystem 68, whereas Bay No. 4 of each bay pair 3/4 can be inflated by pressure source B using air distribution subsystem 70. Bays Nos. 3 and 4, which again correspond to bays 28 and 26 shown in FIG. 7, can be inflated in sequence or concurrently. Although not shown in FIG. 6, valves may be installed at appropriate locations to enable the inflation of Bays Nos. 1 and 2 or 3 and 4 in sequence.

The arrangement shown in FIG. 6 enables the inflatable bays in alternating columns (i.e., spanwise segments) to be inflated using independent sources of pressurized air, thereby mitigating the effects of rupture of any one bay by maintaining pressure across the other half of the flap. The use of two separate pressure sources mitigates the effect of a failure of a pressure source.

In accordance with another embodiment, the configuration of the bladder system can be tailored to create spanwise variation in the deployment angle of the split flap to best meet aerodynamic demands. An exemplary apparatus comprises an airfoil having upper and lower surfaces; a deployable flap having a forward edge supported by the lower surface and extending in a spanwise direction; and a bladder system comprising a first inflatable spanwise section disposed between the upper surface and a first spanwise section of the flap, and a second inflatable spanwise section disposed between the upper surface and a second spanwise section of the flap. Such an embodiment has been previously described with reference to FIGS. 6 and 7. A spanwise variation in flap deflection can be provided configuring one inflatable spanwise section of the bladder system (e.g., section 60 in FIG. 6) to be sufficiently different from another inflatable spanwise section (e.g., section 62 in FIG. 6) that the amounts of deflection of these spanwise sections of the flap are substantially different. For example, the bladder system could be configured such that one end of the split flap deflected by 30° while the other end deflected by 60°, as a result of which the split flap would be twisted along its length.

In accordance with a further embodiment, one or more venturis can be utilized to evacuate the bladder system when flap retraction is commanded. The venturi draws the air back out of the same tubing that was used to inflate the bladder system, thereby deflating a bay or multiple bays of the device. Other tubing could be dedicated for the evacuation, but a preferred solution is to utilize the inflation ports.

Figure 8:
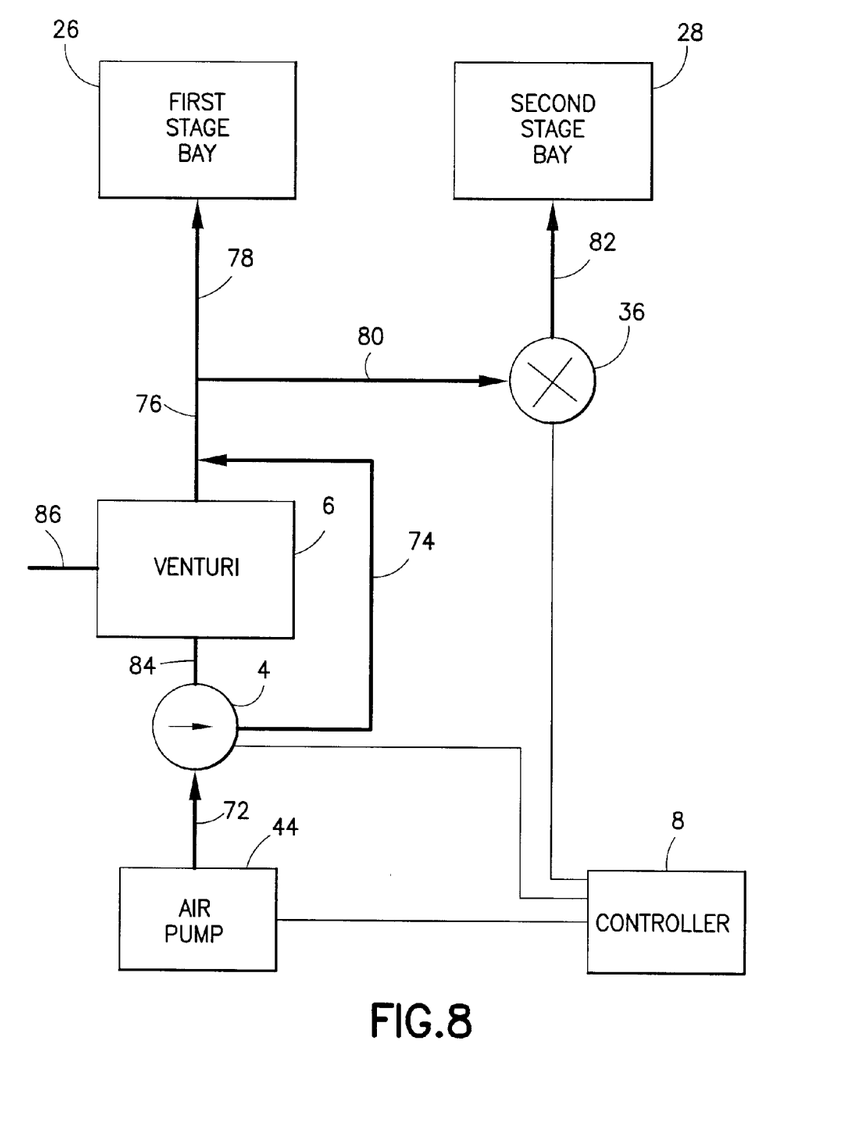
FIGS. 8 and 9 are diagrams showing components of a system for pneumatically actuating deflection and retraction, respectively, of the portion of a split flap depicted in FIGS. 1-3. The boldface arrows indicate airflow through pneumatic connections, while the lines intersecting the controller indicate electrical connections.
Figure 9:
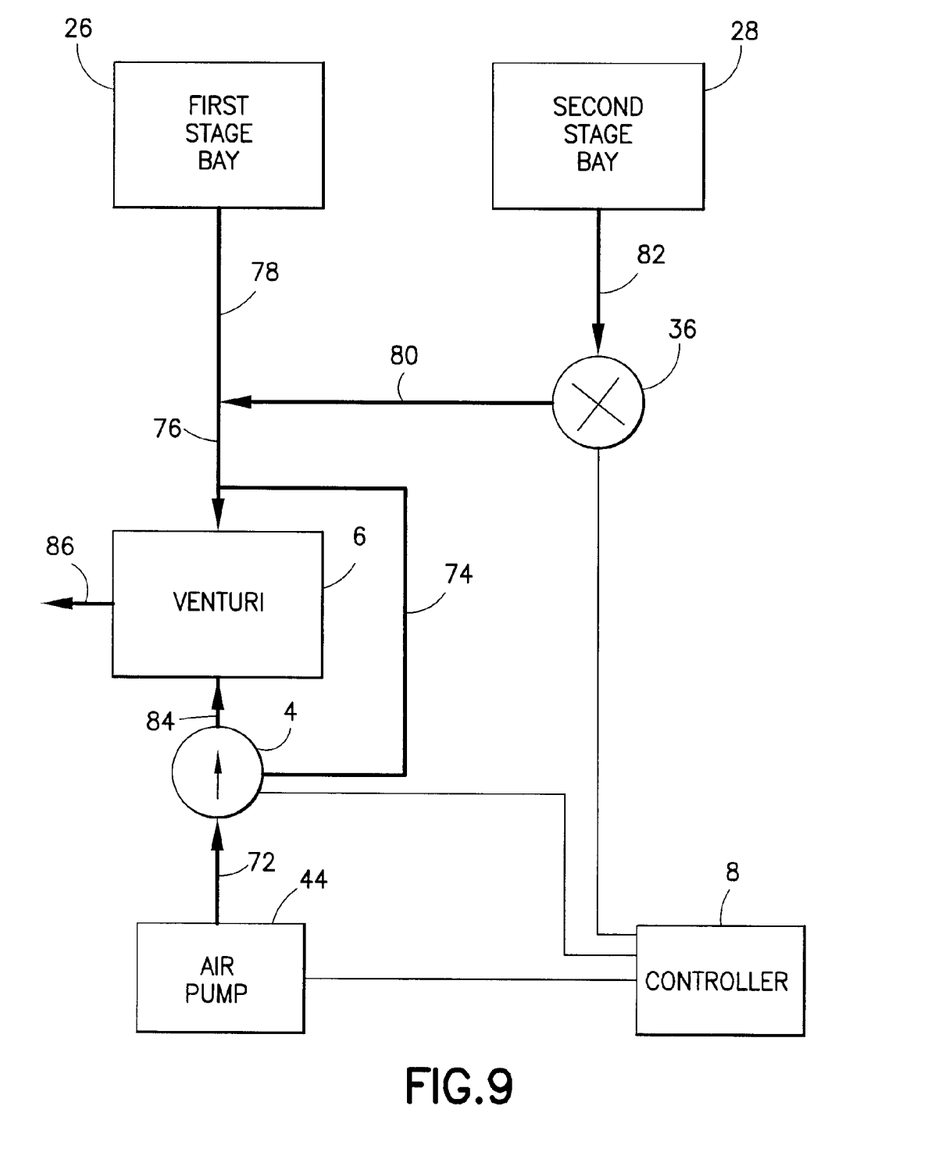

FIGS. 8 and 9 show components of a system for pneumatically actuating either deflection or retraction of the portion of a split flap depicted in FIGS. 1-3. Again the boldface arrows indicate airflow through pneumatic connections (e.g., tubing), while the lines intersecting the controller indicate electrical connections. Air pump 44 is connected to a directional valve 4 by way of tube 72. Activation of air pump 44 and the directional state of valve 4 are electronically controlled by a controller 8. In the inflation mode depicted in FIG. 8, valve 4 directs air flow from pump 44 to a tube 74 that bypasses a venturi 6. The flow through tube 74 is directed to a port of the first-stage bay 26 by tubes 76 and 78, which are connected in series. The controller 8 also controls the state of a valve 36 which, in an open state, couples pressurized air in tube 80 into tube 82. Tube 82 is in turn connected to a port of the second-stage bay 28. The controller can be programmed to open valve 36 after switching the state of valve 4 so that it directs pressurized air into bypass tube 74, in which case bay 28 will be inflated after bay 26 has been inflated.

The venturi 6 has a first port connected to valve 4 via a tube 84, a second port connected to tube 76 and a third port connected to a tube 86. Tube 86 is connected to a vent (not shown). In the inflation mode depicted in FIG. 8, the venturi 6 does not interfere with the air flow from pump 44 to bays 26 and 28, and pressurized air produced by pump 44 does not escape via tube 86.

In contrast, FIG. 9 depicts the system in a deflation mode. The controller 8 is programmed to maintain valve 36 open and switch directional valve 4 so that the latter now directs the pressurized air from pump 44 into tube 84 instead of bypass tube 74. The result of this mode change is that the pressure in tube 76 on one side of venturi 6 becomes lower than the pressure in tube 84 on the other side of venturi 6, causing pressurized air produced by pump 44 to escape from venturi 6 via its third port, flowing into outlet tube 86. The air escaping through the venturi 6 produces a vacuum due to the Bernoulli principle, the vacuum being produced and held as long as the air flow is directed across the venturi, thereby evacuating bays 26 and 28. The resulting reverse air flow through tubes 76, 78, 80 and 82, which causes bays 26 and 28 to deflate, is indicated by arrowheads in FIG. 9.

Figure 10:
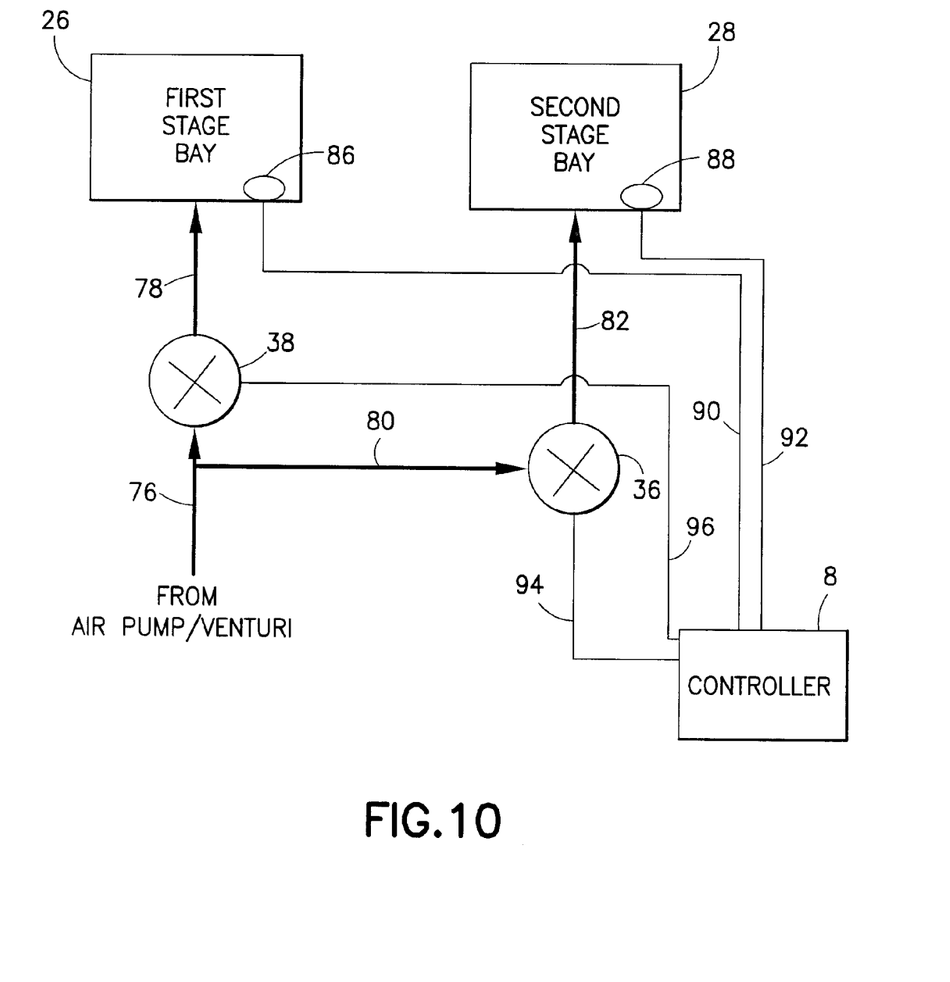
FIG. 10 is a diagram showing some components of a pneumatic bladder actuation system having means for leak mitigation in accordance with a further embodiment. The boldface arrows indicate airflow through pneumatic connections, while the lines intersecting the controller indicate electrical connections.

FIG. 10 shows components of a pneumatic bladder actuation system having means for leak mitigation in accordance with a further embodiment. This embodiment differs from the embodiment depicted in FIG. 8 in that a valve 38 is disposed between tubes 76 and 78, and the first- and second-stage bays 26 and 28 are provided with respective pressure transducers 86 and 88 which are connected to the controller 8. FIG. 10 shows the system in an inflation mode, with valves 36 and 38 in an open state. Bay 26 (if intact) will inflate as it receives pressurized air from an air pump (not shown) via tube 76, open valve 38 and tube 78, while bay 28 (if intact) will inflate as it receives pressurized air from the same pump via tubes 76 and 80, open valve 36 and tube 82.

In accordance with this embodiment, means are provided for detecting and mitigating a leak in any of the bladder sections. The controller receives signals representing the internal pressure of bay 26 from pressure transducer 86 via electrical connection 90, while it also receives signals representing the internal pressure of bay 28 from pressure transducer 88 via electrical connection 92. The controller 8 is programmed to monitor the pressure increase of each bay. Should one fail to inflate, the controller would send a signal to the corresponding valve for that bladder and close it off. For example, if the controller were to determine that the pressure signal from pressure transducer 26 indicated that bay 26 was not inflating, then controller 8 would send a control signal (via electrical connection 96) to valve 38, changing the latter's state from open to closed. This would prevent the pressurized air from leaking out any rupture in bay 26, which would have the effect of preventing the inflation of bay 28 also. Similarly, in response to pressure signals from pressure transducer 88 indicating that bay 28 was not inflating, controller 8 would send a control signal (via electrical connection 94) to valve 36, changing the latter's state from open to closed.

This solution provides a means to remain redundant in the event of a leak. Other sections of the flap would still inflate since they have been sized to operate without all bladder sections inflating. Evacuation of the functioning bladder sections would still fully close the flap to restore normal flight configuration.

In the embodiments depicted in FIGS. 1-7 (none of which are to scale), the split flap aft edge appears to be some distance from the true trailing edge of the airfoil. In accordance with other embodiments, however, the split flap aft edge can extend to the true aft edge of the flap/wing/horizontal stabilizer. This results in a more effective split flap from the aerodynamic perspective, but because the volume of a collapsed bladder is difficult to manage in a tiny wedge, this may require a thicker trailing edge tip, resulting in greater drag when the flap is retracted.

While the invention has been described with reference to various embodiments, it will be understood by those skilled in the art that various changes may be made and equivalents may be substituted for elements thereof without departing from the scope of the invention. For example, two spanwise-segmented (by chordwise septa) bladders attached to each other may be substituted for a single spanwise-segmented (by chordwise septa) bladder in which each spanwise segment comprises a pair of bays formed by a spanwise septum. Alternatively, a spanwise array of bladders attached in series, in which each bladder comprises a pair of bays formed by a spanwise septum, may be substituted for a single spanwise-segmented (by chordwise septa) bladder in which each spanwise segment comprises a pair of bays formed by a spanwise septum. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "hinge" should not be construed to encompass only a hinge made with movable components (such as a piano hinge), but rather should be given a meaning that further encompasses other types of hinges, such as a hinge made of flexible material (e.g., a flexible connection or living hinge).

The invention claimed is:

1. An apparatus comprising:
an airfoil having upper and lower surfaces;
a hinge attached to said lower surface;
a deployable flap attached to said hinge and extending in a spanwise direction, said flap being rotatable about an axis of said hinge between an undeflected angular position in which said flap is aligned with said lower surface, a partially deployed angular position in which said flap is deflected at a first angle relative to said lower surface, and a fully deployed angular position in which said flap is deflected at a second angle relative to said lower surface, said second angle being greater than said first angle; and
a bladder system comprising first and second bays which are individually inflatable and adjacent to each other, said first and second bays being disposed inside said airfoil between a portion of said flap and said upper surface when said flap is in said undeflected position, wherein said flap will be in said undeflected position when said first and second bays are deflated, in said partially deployed position when said first bay is inflated and said second bay is deflated, and in said fully deployed position when said first and second bays are both inflated.

2. The apparatus as recited in claim 1, wherein said bladder system is made of a collapsible fiber-reinforced material.

3. The apparatus as recited in claim 1, wherein said first bay ceases to expand in response to internal air pressure when a predetermined volume is attained.

4. The apparatus as recited in claim 1, further comprising a source of pressurized air, an air inlet tube for carrying pressurized air from said pressurized air source to said second bay, a valve installed between said pressurized air source and said air inlet tube, and a controller programmed to activate said pressurized air source and to open said valve in response to a command, thereby inflating said second bay.

5. The apparatus as recited in claim 1, further comprising a source of pressurized air, first and second valves in fluid communication with said pressurized air source, first and second air inlet tubes in fluid communication with said first and second valves respectively and with said first and second bays respectively, and a controller programmed to activate said pressurized air source and to open said first and second valves in response to a command, thereby supplying pressurized air to said first and second bays.

6. The apparatus as recited in claim 5, further comprising first and second pressure transducers which detect the internal pressure in said first and second bays respectively, wherein said controller is further programmed to close said first valve in response to a signal from said first pressure transducer indicating that said first bay is not inflating and to close said second valve in response to a signal from said second pressure transducer indicating that said second bay is not inflating.

7. The apparatus as recited in claim 1, further comprising a source of pressurized air, a directional valve connected to receive pressurized air from said pressurized air source, an air distribution system that distributes air to inflate said first and second bays when said pressurized air source is activated and said directional valve is in a state that directs the pressurized air to said air distribution system, and a venturi connected to said directional valve and said air distribution system, wherein pressurized air in said first and second bays escapes via said venturi to deflate said first and second bays when said pressurized air source is activated and said directional valve is in a state that directs the pressurized air to said venturi instead of to said air distribution system.

8. The apparatus as recited in claim 1, wherein said bladder system further comprises third and fourth bays which are individually inflatable and adjacent to each other, said third and fourth bays being disposed between said flap and said upper surface, and said apparatus further comprises first and second sources of pressurized air each capable of operating independently, said first pressurized air source being connected to supply pressurized air to said first and second bays, and said second pressurized air source being connected to supply pressurized air to said third and fourth bays.

9. The apparatus as recited in claim 8, wherein said first and second bays are separated by a first spanwise septum, said third and fourth bays are separated by a second spanwise septum, said first and third bays are separated by a first chordwise septum, and said second and fourth bays are separated by a second chordwise septum.

10. The apparatus as recited in claim 1, wherein said airfoil further comprises a trailing edge having a lower surface, said flap being aligned with said lower surface of said trailing edge when said flap is in said undeflected position.

11. The apparatus as recited in claim 1, wherein said airfoil is one of the following: a flight control surface, a wing or a horizontal stabilizer.

\* \* \* \* \*